(12) United States Patent
Singh et al.

(10) Patent No.: US 7,769,862 B2
(45) Date of Patent: Aug. 3, 2010

(54) METHOD AND SYSTEM FOR EFFICIENTLY FAILING OVER INTERFACES IN A NETWORK

(75) Inventors: Ravi I. Singh, Sunnyvale, CA (US); Tuyen Nguyen, San Ramon, CA (US)

(73) Assignee: Check Point Software Technologies Inc., Redwood City, CA (US)

( * ) Notice: Subject to any disclaimer, the term of this patent is extended or adjusted under 35 U.S.C. 154(b) by 1661 days.

(21) Appl. No.: 10/741,594

(22) Filed: Dec. 19, 2003

(65) Prior Publication Data

US 2005/0177762 A1 Aug. 11, 2005

(51) Int. Cl.
*G06F 15/173* (2006.01)
(52) U.S. Cl. ............... 709/226; 709/208; 709/223; 709/250; 370/216; 370/219
(58) Field of Classification Search ........ 709/223, 709/224, 208, 209, 226, 239, 250; 370/241, 370/242, 216, 217, 219, 220, 225
See application file for complete search history.

(56) References Cited

U.S. PATENT DOCUMENTS

| | | | | |
|---|---|---|---|---|
| 5,949,753 | A * | 9/1999 | Alexander et al. | 370/216 |
| 6,052,733 | A * | 4/2000 | Mahalingam et al. | 709/223 |
| 6,512,774 | B1 * | 1/2003 | Vepa et al. | 709/224 |
| 6,567,813 | B1 * | 5/2003 | Zhu et al. | 707/100 |
| 6,671,253 | B1 * | 12/2003 | Alexander et al. | 709/239 |
| 6,721,801 | B2 * | 4/2004 | Najjar | 709/239 |
| 7,257,629 | B2 * | 8/2007 | Manzardo | 709/224 |
| 7,403,474 | B2 * | 7/2008 | Rorie | 370/219 |
| 7,505,401 | B2 * | 3/2009 | Kashyap | 370/217 |
| 7,525,904 | B1 * | 4/2009 | Li et al. | 370/219 |
| 2002/0194268 | A1 * | 12/2002 | Lai | 709/203 |
| 2003/0130833 | A1 * | 7/2003 | Brownell et al. | 703/23 |
| 2005/0013255 | A1 * | 1/2005 | Knop et al. | 370/241 |
| 2009/0073875 | A1 * | 3/2009 | Kashyap | 370/228 |

OTHER PUBLICATIONS

Peter L. Higgins and Michael C. Shand, "Development of Router Clusters to Provide Fast Failover in IP Networks", Digital Technical Journal, vol. 9, No. 3, Winter 1997.
T. Li, B. Cole, P. Morton and D. Li, "Cisco Hot Standby Router Protocol (HSRP)", Network Working Group, RFC 2281, Mar. 1998.
S. Knight, D. Weaver, D. Whipple, R. Hinden, D. Mitzel, P. Hunt, P. Higginson, M. Shand and A. Lindem, "Virtual Router Redundancy Protocol," Network Working Group, Rfc 2338, Apr. 1998.

* cited by examiner

*Primary Examiner*—Ramy M Osman
(74) *Attorney, Agent, or Firm*—Squire, Sanders & Dempsey, LLP

(57) ABSTRACT

A method and apparatus is directed towards managing fail-over in a network. At least one back-up device is configured to process traffic if a fail-over condition occurs. The back-up device includes a physical interface. A logical interface X associated with the physical interface is monitored to determine if the fail-over condition has occurred. If it is determined that the fail-over condition has occurred on interface X, then the back-up device processes traffic for another logical interface Y, associated with the physical interface. Accordingly, logical interface Y may be unmonitored. According to one embodiment, if it is determined that the fail-over condition has occurred, the back-up device processes traffic for every logical interface associated with the physical interface.

20 Claims, 4 Drawing Sheets

METHOD AND SYSTEM FOR EFFICIENTLY FAILING OVER INTERFACES IN A NETWORK

FIELD OF THE INVENTION

The invention is related to computer networks, and in particular, to an apparatus and method for efficient, conjoined fail-over of logical interfaces.

BACKGROUND OF THE INVENTION

Internet protocol (IP) forwarding works by forwarding remotely-destined IP packets to a router that has a (generally, the best) path to the destination. The purpose of routing is to enable the choice of the best possible next-hop. The choice of next-hop can be dynamically determined by using a routing protocol or it can be statically configured.

In cases where a next-hop for a certain destination is statically configured, the unavailability of the next-hop causes the destination to become unreachable. To alleviate this problem, multiple independent devices can be used that can redundantly serve as next-hops for a given destination without having to make configuration changes on the neighbors. So, if a redundant device is unavailable, then another redundant device may take its place. This per-interface fail-over is achieved by failing-over a virtual IP address (hereinafter VIP or virtual IP), which serves as the next-hop, from one device to another. The fail-over of the VIP on a certain logical channel between the redundant devices may be achieved by running a high-availability (HA) protocol on the logical channel to make a decision about which of the redundant devices owns the VIP.

It is typical to create multiple logical interfaces on a given physical interface. This allows sharing of the same physical medium for different logical channels of traffic. A group of redundant devices may have different VIPs assigned to multiple logical interfaces. If so, an HA protocol is run on each of these logical interfaces.

BRIEF DESCRIPTION OF THE DRAWINGS

Non-limiting and non-exhaustive embodiments of the present invention are described with reference to the following drawings, in which.

DETAILED DESCRIPTION

Figure 1:
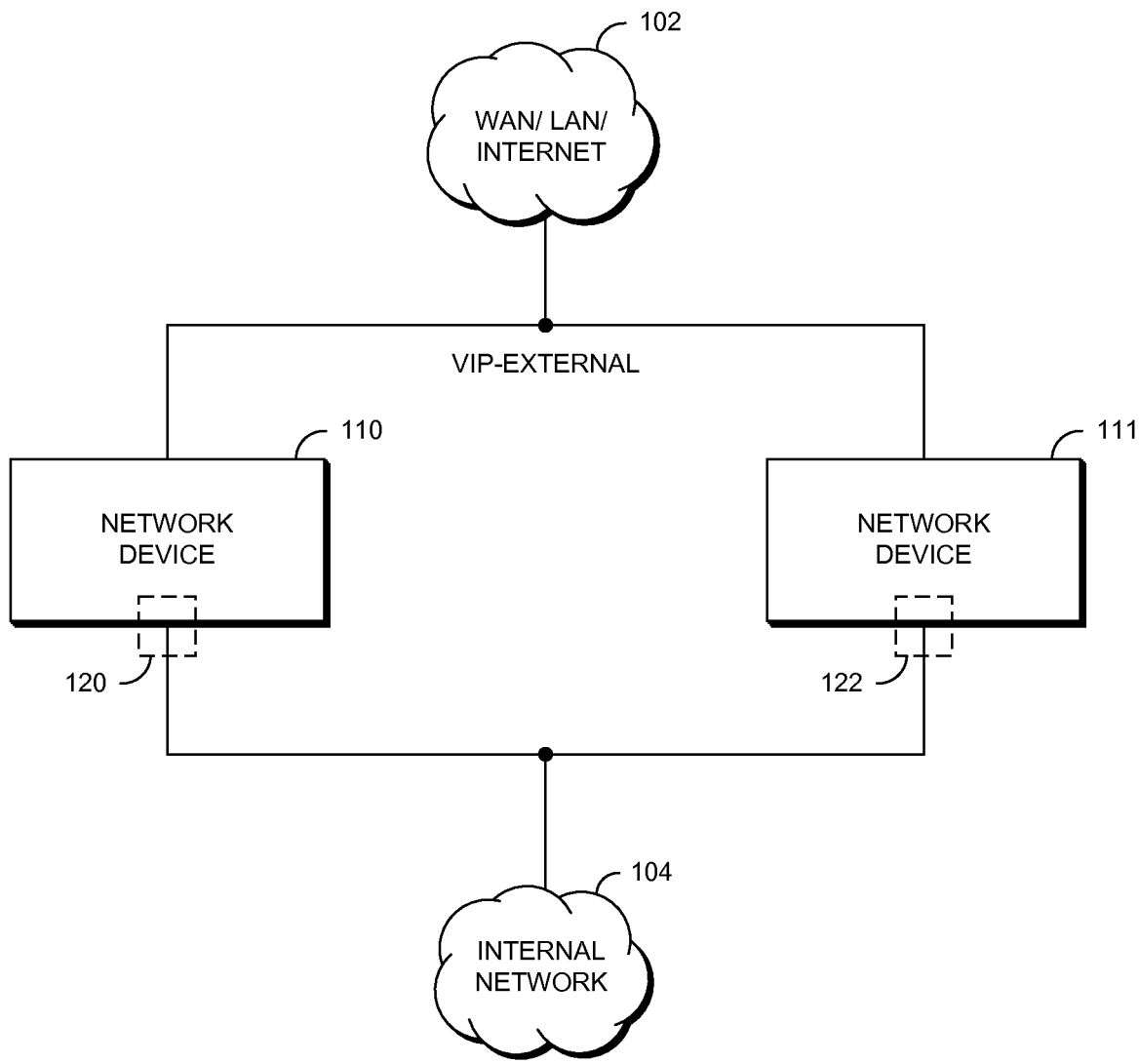
FIG. 1 illustrates a block diagram of an embodiment of a system.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference.

Briefly stated, the invention is related to a method and apparatus for managing fail-over in a network. At least one back-up device is configured to process traffic if a fail-over condition occurs. The back-up device includes a physical interface. A logical interface associated with the physical interface is monitored to determine if the fail-over condition has occurred. If it is determined that the fail-over condition has occurred, then the back-up device processes traffic for another logical interface associated with the physical interface. According to one embodiment, if it is determined that the fail-over condition has occurred, the back-up device processes traffic for every logical interface associated with the physical interface.

FIG. 1 illustrates a block diagram of an embodiment of system 100. System 100 includes an external network that can include a wide area network, a local area network, and the Internet (WAN/LAN/Internet) 102. System 100 also includes network devices 110 and 111, and internal network 104, which may include local area networks, wide area networks, and the like. Network device 110 includes transceiver 120. Network device 111 includes transceiver 122. Network device 110 is configured to process traffic received at transceiver 120 that is addressed to logical interfaces associated with transceiver 120. Similarly, network device 111 is configured to process traffic received at transceiver 122.

Also, network device 111 is configured to monitor a signal at a logical interface that is associated with transceiver 122 to determine if a condition has occurred. According to one embodiment, this condition is a failure of transceiver 120. If network device 111 determines that the condition has occurred, then network device 111 assumes the role of network device 1O at a different logical interface that is also associated with transceiver 122.

In another embodiment, device 110 is configured to monitor a signal at a logical interface that is associated with transceiver 120 to determine if a condition has occurred. This condition is a failure of transceiver 122, and if it occurs, network device 110 assumes the role of network device 111 at a different logical interface that is also associated with transceiver 120. Additionally, network devices may be any one of a router, bridge, firewall, proxy server, switch, and the like.

Figure 2:
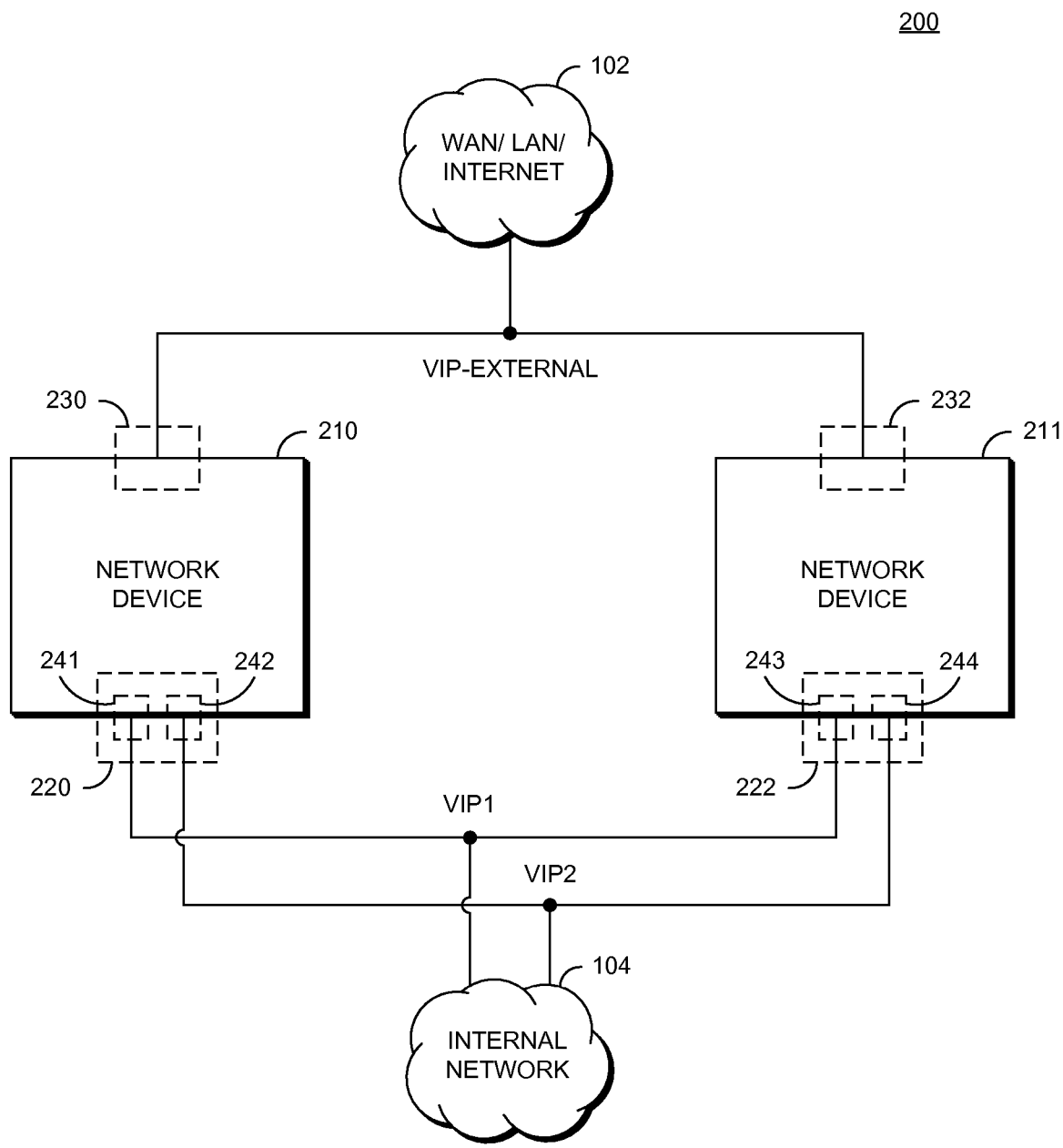
FIG. 2 shows a block diagram that illustrates multiple logical interfaces of a system that is an embodiment of the system of FIG. 1.

FIG. 2 shows a block diagram of system 200 that illustrates multiple logical interfaces. System 200 includes WAN/LAN/Internet 102, network devices 210 and 211, and internal network 104. Network devices 210 and 211 may be configured to operate in a manner substantially similar to network devices 110 and 111, respectively. In one embodiment, network devices 210 and 211 are the same type of network device and in another embodiment the types are dissimilar, e.g., a bridge and a router. Network device 211 includes transceivers 222 and 232. Transceiver 222 is coupled to a lower LAN, and transceiver 232 is coupled to an upper LAN. Network device 210 includes transceivers 220 and 230. Transceiver 220 is coupled to the lower LAN and transceiver 230 is coupled to the upper LAN. Network devices 210 and 211 may further include a processor (not shown) for performing actions.

Network device 210 may be configured as a default master. Logical interfaces 241 and 242 are associated with transceiver 220. Also, logical interfaces 243 and 244 are associated with transceiver 222. A physical channel including first and second logical channels is coupled between transceivers 220 and 222. Logical interfaces 241 and 243 are each configured to receive signals from the first logical channel, and logical interfaces 242 and 244 are each configured to receive signals from the second logical channel.

Network device 210 is configured to provide a signal at logical interface 241. According to one embodiment, the signal is an advertisement signal. Network device 211 is configured to monitor the advertisement signal. This signal is received by network device 211 through logical interface 243. Network device 211 is further configured to determine if a failure condition has occurred based on the advertisement signal. Network device 211 is further configured to perform a role of network device 210 at logical interface 244 if it is determined that the condition has occurred.

If a state-based protocol is employed with the system 200, a first state may be associated with logical interface 241, a second state may be associated with logical interface 242, a third state may be associated with logical interface 243, and a fourth state may be associated with logical interface 244. Each of the four states may correspond to a master state or a back-up state. The actions that may be performed by network devices 210 and 211 in accordance with the states are explained in greater detail below. If a logical interface associated with network device 211 corresponds to a master state, network device 211 performs a master role on this logical interface. If a logical interface associated with network device 211 corresponds to a back-up state, network device 211 performs a back-up role on this logical interface.

In one embodiment, if network device 211 is called on to perform the role of network device 210 on the network of logical interface 244, it performs this role by performing a master role on the network of logical interface 244. Also, according to another embodiment, if it is determined that the failure condition has occurred at network device 210, network device 211 is further configured to perform the role of network device 210 on every logical interface that is associated with transceiver 222.

A monitored logical interface may be associated with transceiver 230. In one embodiment, if network device 210 is performing the master role, network device 210 monitors the monitored logical interface to determine whether the monitored logical interface has failed. If network device 210 determines that the monitored logical interface associated with transceiver 230 has failed, network device 210 may perform the back-up role on logical interfaces 241 and 242. If this occurs, network device 210 may also communicate to network device 211 that the monitored logical interface associated with transceiver 230 has failed. If network device 211 determines that the monitored logical interface associated with transceiver 230 has failed, network device 211 may perform the master role on logical interfaces 243 and 244.

Similarly, if network device 211 is performing the master role on logical interface 243, network device 211 may monitor a logical interface that is associated with transceiver 232 in a substantially similar manner as described above.

Additionally, network device 210 may be configured to monitor logical interface 241 if network device 210 is performing the master role on logical interface 241. If network device 210 determines that logical interface 241 has failed, network device 210 may fail-over each logical interface associated with transceiver 230. Similarly, if network device 211 is performing the master role on logical interface 243, network device 211 may monitor logical interface 243 and fail-over each logical interface associated with transceiver 232 if network device 211 determines that logical interface 243 has failed.

Network devices 210 and 211 may be configured to act as a single virtual network device. The virtual network device may be used as a redundant statically configured next-hop for forwarding purposes. A host in internal network 104 can be statically configured to use the virtual network device as a next hop address. A virtual IP address, rather than a physical IP address, may be used to identify the next hop. (The virtual IP address may or may not be the physical address of network devices 210 or 211). More than one virtual IP address may be associated with the virtual network device. First virtual IP address VIP1 may be associated with the first logical channel, and second virtual IP address VIP2 may be associated with the second logical channel.

System 200 is configured such that for each logical channel, one of network devices 210 and 211 assumes a master role, and the other network device assumes a back-up role. The network device that is assuming a master role may be configured to process packets, destined to the MAC corresponding to the VIP, that are received through the associated logical interface. The network device that is assuming a back-up role may be configured to drop packets, destined to the MAC corresponding to the VIP, received through the associated logical interface.

If a packet is forwarded to the MAC corresponding to first virtual IP address VIP1, and network device 210 is assuming the master role on the network of logical interface 241, then network device 210 processes the packet. Similarly, if a packet is forwarded to the MAC corresponding to virtual IP address VIP1, and network device 211 is assuming the master role on the network of logical interface 243, then network device 211 processes the packet. If a packet is forwarded to the MAC corresponding to second virtual IP address VIP2, and network device 210 is assuming the master role on the network of logical interface 242, then network device 210 processes the packet. In a substantially similar way, if a packet is addressed to virtual IP address VIP2, and network device 211 is assuming the master role on the network of logical interface 244, then network device 211 processes the packet.

To use network devices 210 and 211 as a redundant statically configured next-hop, an HA protocol may be used. For example, any of a variety of HA protocols could be used, including but not limited to "Virtual Router Redundancy Protocol" (VRRP), "Hot Standby Router Protocol" (HSRP), "IP Standby Protocol" (IPSTB), and the like. An HA protocol may be used to fail-over a logical interface from one network device to another. If an HA protocol is used according to the prior art, the protocol is run on each logical channel, and the fail-over of one logical interface associated with a physical interface does not affect the fail-over status of the other logical interfaces associated with the physical interface. In contrast, in system 200, the fail-over status on the network of logical interface 242 is affected by the fail-over status on the network of logical interface 241.

According to one embodiment, transceivers 220 and 222 are Ethernet ports of network devices 210 and 211, respectively. In this embodiment, logical interface 243 is an untagged virtual local area network (VLAN) interface for network device 211, and logical interface 241 is an untagged VLAN interface for network device 210. Similarly, logical interface 244 may be a tagged VLAN interface for network device 211, and logical interface 242 may be a tagged VLAN interface for network device 210. Accordingly, the decision to fail-over the tagged VLAN interface may be dependent on a decision to fail-over the untagged VLAN interface.

Network device 211 may include additional transceivers on the lower LAN. In this embodiment, each of the transceivers may include a logical interface that is an anchor interface (an interface that runs the fail-over protocol). For each transceiver on the lower LAN, the anchor interface is monitored for a failure condition. For each transceiver on the lower LAN, network device 211 performs the master role on each logical interface associated with the transceiver if a failure condition is determined to have occurred at the anchor interface of the transceiver.

According to one embodiment, address resolution protocol (ARP) requests may be handled as follows. If an ARP request is made for VIP1, network device 210 responds to the ARP request if network device 210 is assuming the master role for logical interface 241, and network device 211 responds to the ARP request if network device 211 is assuming the maser role for logical interface 243. The responding device responds to an ARP request for VIP1 with a virtual media access control (MAC) address that may correspond to a first virtual router ID number. The first virtual ID number may be employed to identify VIP1. If an ARP request is made for VIP2, network device 210 responds to the ARP request if network device 210 is assuming the master role for logical interface 242, and network device 211 responds to the ARP request if network device 211 is assuming the maser role for logical interface 244. The responding device responds to an ARP request for VIP2 with a virtual MAC address that may correspond to a second virtual router ID number. The second virtual router ID number may be employed to identify VIP2.

If network device 210 is assuming the master role on logical interface 241, network device 210 may send the advertisement signal by multicasting a plurality of advertisement packets. Each advertisement packet includes a field that indicates the first virtual router ID. Each advertisement packet is sent after a pre-determined period of time has occurred since the last advertisement packet was sent. According to one embodiment, network device 211 determines that the condition has occurred if an amount of time since any advertisement packet of the advertisement packets were received exceeds a particular pre-determined interval.

Figure 3:
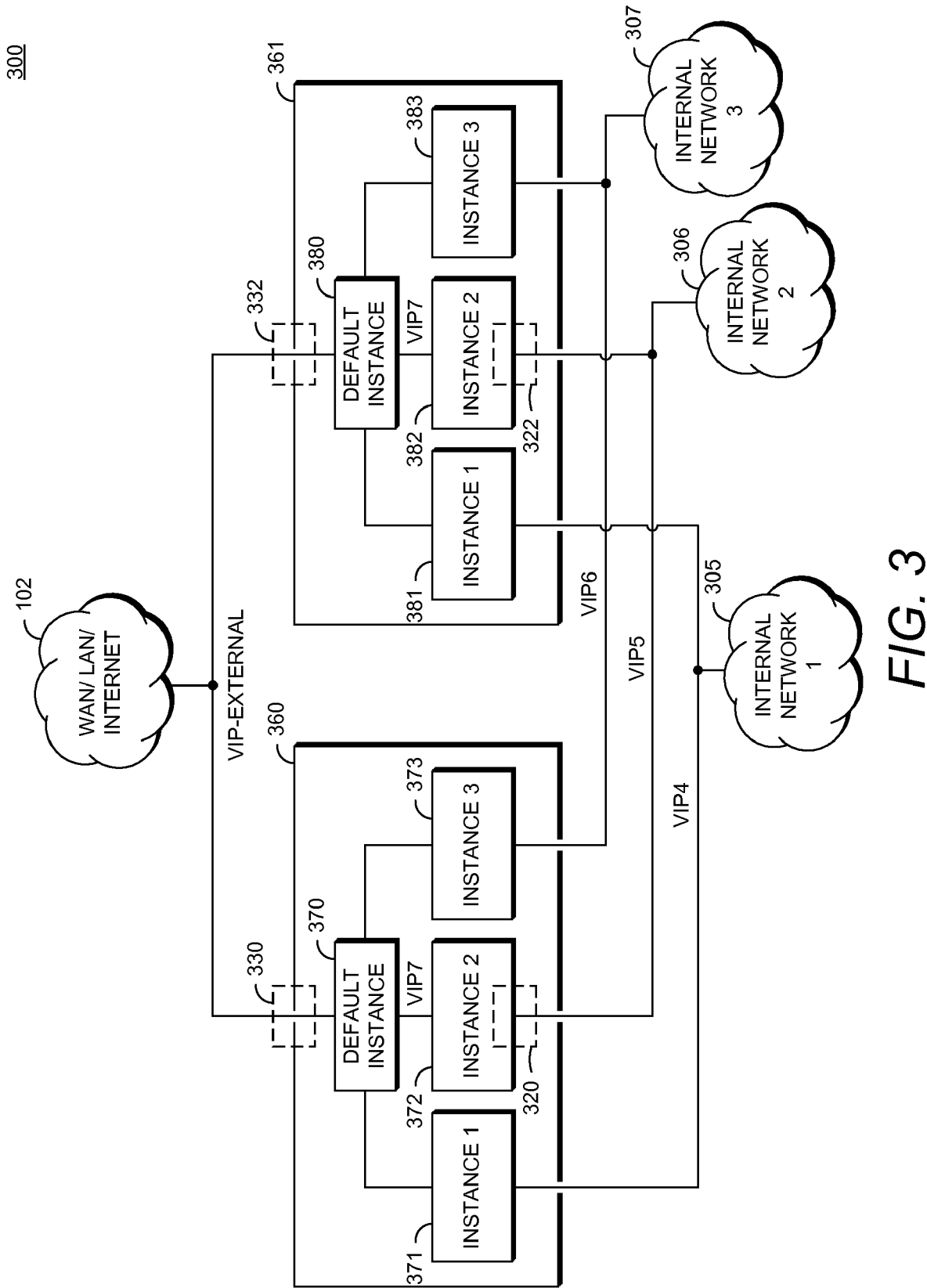
FIG. 3 illustrates a block diagram that shows simulated interfaces for a system that is another embodiment of the system of FIG. 1.

FIG. 3 illustrates a block diagram of system 300 that shows a simulated interface. System 300 includes internal networks 305-307, network devices 360-361, and WAN/LAN/Internet 102. Network device 360 includes default instance 370 and instances 1-3 (371-373). As shown in this embodiment, network devices 360 and 361 are configured as firewalls. However, in another embodiment, network devices 360 and 361 may be dissimilar types of network devices.

Network device 361 includes default instance 380 and instances 1-3 (381-383). Default instance 380 and instances 1-3 may be software components that simulate physical devices. Network devices 360 and 361 are configured to operate as a high-availability setup of virtualized network devices. For each network device, the default instance in conjunction with each one of the other instances acts like a different independent device. In this case, the physical high-availability pair of physical devices acts like three virtual high-availability pairs of devices.

Network device 360 and 361 each have external interfaces, as well as a simulated interface. The simulated interface simulates an internal interface between instance 2 and the default instance. The simulated internal interface is addressable externally. The simulated interface may be a software component that simulates a physical internal interface. VIP4 is associated with instance 1, VIP5 is associated with instance 2, and VIP6 is associated with instance 3. VIP7 is associated with the simulated internal interface between instance 2 and the default instance.

Network device 360 includes transceivers 320 and 330, and network device 361 includes transceivers 322 and 332. Network device 361 includes a first logical interface that is associated with VIP5, and a second logical interface that is associated with VIP7. Similarly, network device 360 includes a third logical interface that is associated with VIP5, and a fourth logical interface that is associated with VIP7. The first logical interface is associated with transceiver 322. The second logical interface is associated with transceiver 322 and with the simulated internal interface between instance 382 and default instance 380. The third logical interface is associated with transceiver 320. The fourth logical interface is associated with transceiver 320 and with the simulated internal interface between instance 372 and default instance 370. Virtual IP address VIP7 may be advertised using proxy ARP.

In one embodiment, network device 360 may be configured as a default master. Network device 360 provides an advertisement signal at the third logical interface if network device 360 is assuming a master role on the third logical interface. For this embodiment, network device 361 is configured to monitor the advertisement signal to determine if a failure condition has occurred. If network device 361 determines that the failure condition has occurred, network device 361 assumes the master role on the second logical interface. Additionally, in another embodiment, the roles could be reversed and network device 361 could be configured as the default master and network device 360 could assume the master role in a substantially similar manner if the failure condition is detected.

Figure 4:
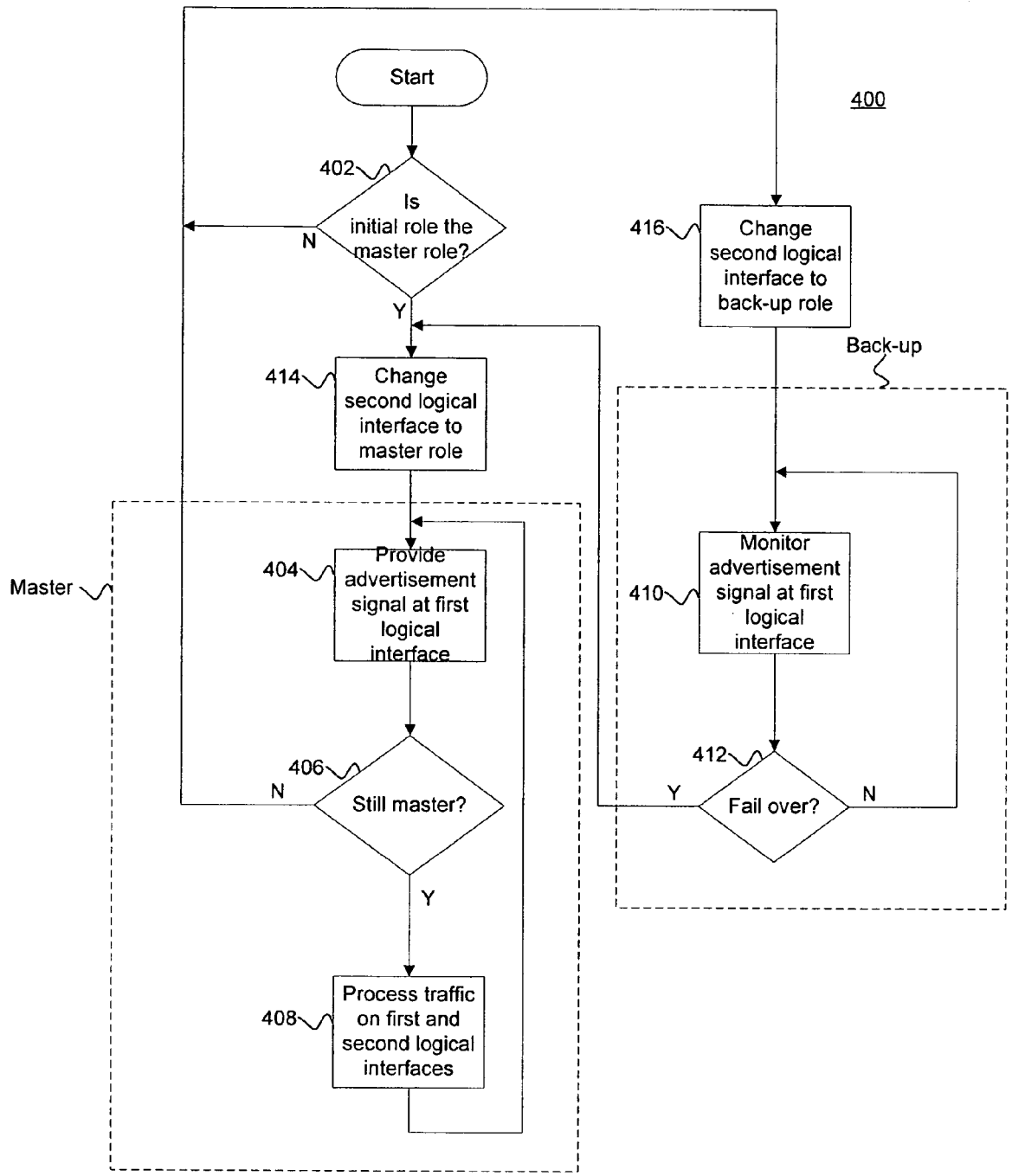
FIG. 4 shows a flow chart of an embodiment of a process for managing fail-over, in accordance with aspects of the invention.

FIG. 4 shows a flow chart for an embodiment of process 400 for managing fail-over from a back-up role to a master role where a first logical interface and a second logical interface are associated with a transceiver for a network device. After a start block, the process proceeds to decision block 402 where a determination is made as to whether the network device is configured as a default master. If the network device is not configured as a default master (instead currently configured as a back up), the process proceeds from decision block 402 to block 416, where second logical interface is changed to perform a back-up role. The process then proceeds from block 416 to block 410, where an advertisement signal is monitored at the first logical interface.

Next, the process proceeds from block 410 to decision block 412, where a determination is made as to whether a failure condition has occurred based on the monitoring of the advertisement signal at the first logical interface. According to one embodiment, the determination is made based on a timer. The timer may fire if a pre-determined interval of time occurs without receiving an advertisement packet at the first logical interface. If an advertisement packet is received at the first logical interface, the timer may reset. If the timer fires, the process may determine that the failure condition has occurred.

If the failure condition has not occurred, the process returns to block 410 where substantially the same actions discussed above are performed again.

However, if it is determined at decision block 412 that the failure condition has occurred at the first logical interface, the process proceeds to block 414 where the master role is performed by the network device on the first and second logical interfaces. Next, the process proceeds from block 414 to block 404, where another advertisement signal is provided at the first logical interface. Moving to decision block 406, a determination is made as to whether the network device is still performing the master role on the first logical interface. In one embodiment, if the network device receives an advertisement packet from another network device with a higher priority, the network device performs a back-up role on the first logical interface.

At decision block 406, if it is determined that the network device is still the master of the first logical interface, the process proceeds to block 408 where the network device processes traffic received through the first and second logical interfaces. Next, the process returns to block 404 where substantially the same actions discussed above are performed.

Alternatively, if it is determined at decision block 406 that a back-up role is being performed on the first logical interface by the network device, the process proceeds to block 416 where substantially the same actions discussed above are performed. Additionally, at decision block 402, if the determination for the default master is affirmative, the process advances to block 414 where substantially the same actions discussed above are performed.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A first network device, comprising:
    a first transceiver comprising a first logical interface and a second logical interface;
    wherein each logical interface of the transceiver is connected to one or more logical interfaces of a second network device; and
    a processor configured to:
    monitor a signal received at the first logical interface;
    determine, based on the signal, whether a failover condition has occurred at the second network device; and
    assume a role of the second network device at both the first logical interface and the second logical interface based on the failover condition.

2. The first network device as in claim 1, wherein the signal is an advertisement signal sent from the second network device, and wherein the advertisement signal includes a periodic flow of packets.

3. The first network device as in claim 1, wherein the signal is sent from the second network device, and wherein the fail-over condition is a failure of a second transceiver that is associated with the second network device.

4. The first network device of claim 1, wherein the signal includes packets, and wherein the determination of the fail-over condition is based upon a time interval between the packets.

5. The first network device of claim 1, wherein the processor is further configured to:
    if a packet is forwarded to an address that is associated with the second logical interface:
        if the first network device is performing a back-up role on the second logical interface, drop the packet; and
        if the first network device is assuming the role of the second network device on the second logical interface, process the packet.

6. The first network device of claim 1, wherein the processor is further configured to assume the role of the second network device on every logical interface that is connected with the first transceiver.

7. The first network device of claim 1, further including a second transceiver, wherein a monitored logical interface is associated with the second transceiver, and wherein the processor is further configured to:
    monitor the monitored logical interface;
    determine if the monitored logical interface has failed; and
    if the monitored logical interface has failed, assume a back-up role on the first and second logical interfaces.

8. The first network device of claim 1, wherein the second logical interface is a simulated internal interface that is externally addressable.

9. A system for a managing fail-over condition on a network, comprising:
    a first network device comprising a transceiver and a processor, wherein the first network device is configured to assume a master role on the network; and
    a second network device configured to transmit a signal,
    wherein the transceiver comprises a first logical interface and a second logical interface,
    wherein each logical interface of the transceiver is connected to one or more logical interfaces of the second network device, and
    wherein the processor is configured to:
    monitor the signal received through the first logical interface of the first network device;
    determine, based on the signal, that a fail-over condition has occurred on one or more of the logical interfaces of the second network device; and
    assume, based on the fail-over condition, the master role on the network at both the first logical interface and the second logical interface of the first network device for each of the one or more logical interfaces of the second network device.

10. The system of claim 9, wherein the first network device is further configured to:
    if a packet is forwarded to an address that is associated with the first logical interface:
        if the first network device is performing a back-up role on the first logical interface, drop the packet; and
        if the first network device is performing the master role on the first logical interface, process the packet; and
        if the first network device is performing a back-up role on the second logical interface, drop the packet; and
        if the first network device is performing the master role on the second logical interface, process the packet.

11. The system of claim 9, wherein the signal includes advertisement packets, and wherein if the amount of time since the last advertisement packet was received exceeds a pre-determined time interval, it is determined that the fail-over condition occurred.

12. The system of claim 9, wherein the first network device includes a second transceiver, third and fourth logical interfaces are associated with the second transceiver, the first logical interface is associated with a first virtual media access control address, the second logical interface is associated with a second virtual media access control address, the third logical interface is associated with the first virtual media access control address, and the fourth logical interface is associated with the second virtual media access control address.

13. The system of claim 9, wherein the second network device is configured to provide a second signal at the first logical interface if the second network device is performing the master role on the first logical interface, wherein the first network device includes a second transceiver, third and fourth logical interfaces are associated with the second transceiver, and wherein the first network device is configured to:

if the first network device is performing the master role on the third logical interface, provide the signal at the third logical interface;
if a packet is forwarded to an address that is associated with the third logical interface:
if the first network device is performing a back-up role on the third logical interface, drop the packet; and
if the first network device is performing the master role on the third logical interface, process the packet;
if a packet is forwarded to an address that is associated with the fourth logical interface:
if the first network device is performing the back-up role on the fourth logical interface, drop the packet; and
if the first network device is performing the master role on the fourth logical interface, process the packet; and
if the first network device is performing the back-up role on the third logical interface:
monitor the second signal, wherein the second signal is received through the third logical interface;
determine whether a second condition has occurred based on the second signal; and
perform the master role on the fourth logical channel if it is determined that the second condition has occurred.

14. A method for managing a fail-over condition on a network, comprising;
monitoring a signal, wherein the signal is received through a first logical interface of a first transceiver or a first network device connected with a second transceiver of a second network device, wherein the first network device further comprises a second logical interface;
wherein each logical interface of the first network device is connected to one or more logical interfaces of the second network device;
determining, based on the signal, that a fail-over condition has occurred at the second transceiver; and
performing, at both the first logical interface and the second logical interface of the first network device, a master role of the second transceiver of the second network device based on the fail-over condition, wherein the second transceiver includes multiple logical interfaces and the fail-over condition occurred on one or more of the logical interfaces of the second transceiver.

15. The method of claim 14, further comprising providing the signal, wherein the signal includes advertisement packets, and wherein it is determined that the fail-over condition has occurred if an amount of time since any advertisement packet of the advertisement packets was received exceeds a predetermined time interval.

16. The method of claim 14, further comprising if it is determined that the fail-over condition has occurred, performing the master role on every logical channel that is associated with the second transceiver.

17. The method of claim 14, wherein one of the logical interfaces of the second transceiver is a simulated internal interface that is externally addressable.

18. The method of claim 14, further comprising:
if a packet is forwarded to an address that is associated with the first logical interface:
if a back-up role is being performed on the first logical interface, dropping the packet; and
if the master role is being performed on the first logical interface, processing the packet; and
if the packet is forwarded to an address that is associated with a second logical interface of the first transceiver:
if the back-up role is being performed on the second logical interface, dropping the packet; and
if the master role is being performed on the second logical interface, processing the packet.

19. The method of claim 18, further comprising:
if the master role is being performed on the first logical interface, providing a second signal at the first logical interface;
if the master role is being performed on a third logical interface, providing the signal at the third logical interface, wherein the third logical interface and a fourth logical interface are associated with a third transceiver;
if a packet is forwarded to an address that is associated with the third logical interface:
if the back-up role is being performed on the third logical interface, dropping the packet; and
if the master role is being performed on the third logical interface, processing the packet;
if a packet is forwarded to an address that is associated with the fourth logical interface:
if the back-up role is being performed on the fourth logical interface, dropping the packet; and
if the master role is being performed on the fourth logical interface, processing the packet; and
if the back-up role is being performed on the third logical interface:
monitoring the second signal, wherein the second signal is received through the third logical interface;
determining whether a second condition has occurred based on the second signal; and
performing the master role on the fourth logical channel if it is determined that the second condition has occurred.

20. A network device for managing a fail-over condition on a network, comprising:
processing means for monitoring a signal, wherein the signal is received through a first logical interface of a first transceiver of the network device connected with a second transceiver of a second network device, wherein the first network device further comprises a second logical interface;
wherein each logical interface of the first network device is connected to one or more logical interfaces of the second network device;
processing means for determining, based on the signal, that a fail-over condition has occurred at the second transceiver; and
processing means for performing, at both the first logical interface and the second logical interface of the network device, a master role of the second transceiver of the second network device based on the fail-over condition, wherein the second transceiver includes multiple logical interfaces and the fail-over condition occurred on one or more of the logical interfaces of the second transceiver.

* * * * *